United States Patent [19]
Yunten

[11] Patent Number: 5,867,499
[45] Date of Patent: Feb. 2, 1999

[54] ATM SWITCH HAVING LOCATION INDEPENDENT VIRTUAL-CONNECTION SWITCHES

[75] Inventor: Tamer Yunten, Raleigh, N.C.

[73] Assignee: Northern Telecom Limited, Montreal, Canada

[21] Appl. No.: 775,597

[22] Filed: Dec. 31, 1996

[51] Int. Cl.$^6$ ...................................................... H04J 3/02
[52] U.S. Cl. ............................................................ 370/397
[58] Field of Search ..................................... 370/395, 396, 370/397, 398, 399, 389, 392, 622

[56] References Cited

U.S. PATENT DOCUMENTS

| | | | |
|---|---|---|---|
| 5,271,010 | 12/1993 | Miyake et al. | 370/399 |
| 5,303,233 | 4/1994 | Sugawara | 370/399 |
| 5,467,349 | 11/1995 | Huey et al. | 370/397 |

*Primary Examiner*—Huy D. Vu
*Attorney, Agent, or Firm*—Finnegan, Henderson, Farabow, Garrett & Dunner L.L.P.

[57] ABSTRACT

An ATM switch contains several interface units (including a source interface unit), several virtual-channel (VC) switches (including a source and destination VC switch), and several virtual-channel identifiers (VCI) for each ATM cell. Configuring the ATM switch causes the source interface unit to assign a starting VCI to a cell to indicate an intended destination for the cell within the ATM switch and to pass the cell to a source VC switch. If the intended destination is an interface unit not directly coupled to the source VC switch, the source VC switch converts the starting VCI to an intermediate VCI that reflects the intermediate and destination locations relative to the intermediate VC switch. A destination VC switch receives the ATM cell and converts the intermediate VCI to a final VCI that reflects the source and the destination locations relative to the destination VC switch, and delivers the ATM cell to the destination.

27 Claims, 6 Drawing Sheets

| SOURCE | Current Switch Destinations $u_1\ u_2\ u_3\ u_4....u_{18}$ | Relative Switch 1 Destinations $u_1\ u_2\ u_3\ u_4....u_{18}$ | . . . | Relative SWITCH M Destinations $u_1\ u_2\ u_3\ u_4....u_{18}$ |
|---|---|---|---|---|
| $u_1$ | X  2  3  4...18 | 19............................36 | | ......18*(M + 1) |
| $u_2$ | 1  X  3  4...18 | 19............................36 | | ......18*(M + 1) |
| $u_3$ | 1  2  X  4...18 | 19............................36 | | |
| . | . | . | | |
| . | . | . | | |
| . | . | . | | |
| $u_{18}$ | 1  2  3  4...X | 19............................36 | | ......18*(M + 1) |
| 80 | 82 | 84 | | 86 |

FIGURE 4

| SOURCE | Relative SWITCH 1 Destinations $u_1\ u_2\ u_3\ u_4....u_{18}$ | Relative SWITCH 2 Destinations $u_1\ u_2\ u_3\ u_4....u_{18}$ | . . . | Relative SWITCH M Destinations $u_1\ u_2\ u_3\ u_4....u_{18}$ |
|---|---|---|---|---|
| $u_1$ | 1  2  3  4...18 | 325  326... 342 | | |
| $u_2$ | 19  20  21  22...36 | 343  344... 360 | | |
| $u_3$ | 37  38  39  40...54 | 361  362... 378 | | |
| . | . | . | | |
| . | . | . | | |
| . | . | . | | |
| $u_{18}$ | 307.............324 | ............2*324 | | ..........M*324 |
| 90 | 92 | 94 | | 96 |

FIGURE 6

ATM SWITCH HAVING LOCATION INDEPENDENT VIRTUAL-CONNECTION SWITCHES

BACKGROUND OF THE INVENTION

The present invention relates generally to a technique for configuring an asynchronous transfer mode (ATM) switch or set of switches and switching ATM cells, and specifically to a method and apparatus for routing ATM cells with a generic addressing scheme that operates transparently to the physical location of the source and destination.

ATM offers an advantageous transport structure for digital communications by using a high-bandwidth multiplexing scheme for packet-based transmission of messages. ATM systems communicate information using fixed-size cells of relatively short length. FIG. 1 is a diagram of one such cell. Each cell 10 contains a 5-octet label 12, also called a header, that identifies the cell and the cell's connections. A 48-octet payload 14 follows the header in the ATM cell and carries information intended for a recipient. Switching networks rely on information stored in the header of ATM cells to switch and multiplex the cells along appropriate routes.

ATM header 12 includes a virtual path identifier (VPI) and a virtual connection identifier (VCI) label, referenced collectively as 16, together with other error detection fields 15 and functions 17. VPI-VCI 16 indicates the transport connection for user information within payload 44 and other information.

A switched ATM network will include several nodes, connected together via an ATM switch. A node may comprise a circuit board having electronics for transmitting, receiving, and processing information carried within the payload of the ATM cells. The ATM switch establishes virtual connections between the nodes such that one node can communicate with another node in the ATM network only by way of the ATM switch.

An ATM switch may include a set of virtual channel switches and at least one virtual path switch. A virtual channel switch deciphers the VCI from the VPI-VCI of a received ATM cell and routes the cell locally to nodes coupled to it. A virtual path switch couples virtual channel switches together and routes the ATM cell to an appropriate virtual channel switch based on the VPI of the VPI-VCI field 16.

The VPI-VCI for an ATM cell has a maximum length of 16 bits. Using all 16 bits for the VPI-VCI permits the addressing of $2^{16}$, or 65,536, destinations, and using fewer bits decreases the number of destinations. For example, if a switched network is configured to use only 12 bits in the VPI-VCI for addressing, the network can send an ATM cell to only $2^{12}$, or 4,096, unique interface units. On the other hand, using all 16 bits of the VPI-VCI permits the addressing of more destinations but restricts the use of those bits for other purposes.

Also, the use of unique addressing locations for each possible connection in an ATM switch limits the flexibility of adding or deleting subsystems within the switch. Each replacement module within such an ATM switch must be specially configured with the unique addresses, which increases maintenance and installation efforts. In addition, replacing or adding interface units within a conventional ATM switch may require reconfiguring the entire switch with unique addresses for the interface units.

In light of the foregoing, a need exists for an addressing structure for an ATM switched network that permits using fewer than the entire VPI-VCI field for routing ATM cells, while both allowing an increased number of connections between sources and destinations and decreasing installation and maintenance requirements.

SUMMARY OF THE INVENTION

Additional objects and advantages of the invention will be set forth in the description which follows and in part will be obvious from the description, or may be learned by practice of the invention. The objects and advantages of the invention will be realized and attained by means of the elements and combinations particularly pointed out in the appended claims.

To achieve these and other objects and advantages, and in accordance with the purpose of the invention as embodied and broadly described herein, an ATM switch consistent with this invention for switching ATM cells between ports of the switch, where the ports link the ATM switch with a network comprises a plurality of interface units connected to the ports and arranged in groups. The switch includes a source virtual-channel switch, coupled to a first group of interface units including a source interface unit, which receives the ATM cell having a starting virtual-channel identifier from the source interface unit and associates an intermediate virtual-channel identifier with the ATM cell. The intermediate virtual-channel identifier indicates the source interface unit and a destination interface unit for the ATM cell relative to the source virtual-channel switch. The destination interface unit is within another group of interface units. The ATM switch also comprises a destination virtual-channel switch coupled to the source virtual-channel switch and to a second group of interface units including the destination interface unit. The destination virtual-channel switch converts the intermediate virtual-channel identifier to a final virtual-channel identifier and routes the ATM cell to the destination interface unit, where the final virtual-channel identifier indicates the source and the destination for the ATM cell relative to the destination virtual-channel switch.

A method for configuring an ATM switch consistent with this invention, where the ATM switch includes a set of virtual-channel switches coupled together and each of the set of virtual-channel switches are coupled to a set of interface units, and where the interface units link the ATM switch and a network, comprises the steps of (1) assigning, for one of the set of virtual-channel switches, user codes for the set of interface units coupled to the one virtual-channel switch; (2) assigning, for the one virtual-channel switch, first destination codes for the set of interface units coupled to the one virtual-channel switch and second destination codes for the set of interface units coupled to others of the set of virtual-channel switches; mapping, for the one virtual-channel switch, the user codes to the first destination codes using starting virtual-channel identifiers, each user code having a same starting virtual-channel identifier for respective first destination codes; and (3) mapping, for the one virtual-channel switch, the user codes to the second destination codes using intermediate virtual-channel identifiers, each user code having a unique intermediate virtual-channel identifier for each second destination code.

Another method consistent with this invention for switching an ATM cell from a source to a destination in an ATM switch, where (a) the ATM switch includes a set of virtual-channel switches coupled together, (b) each of the set of virtual-channel switches is coupled to a set of interface units, (c) the interface units link the ATM switch and a network, (d) source of the ATM cell is an interface unit coupled to a source virtual-channel switch, and (e) the destination is an interface unit coupled to a destination virtual-channel switch, comprises the following steps: (1) associating a first virtual-channel identifier with the ATM cell, where the first virtual-channel identifier indicates the source and the destination for the ATM cell relative to the source virtual-channel switch, and where the destination is one of a group of destinations within others of the set of virtual-channel switches; (2) sending the ATM cell from the source virtual-channel switch; receiving the ATM cell at the destination virtual-channel switch; and (3) converting the first virtual-channel identifier to a second virtual-channel identifier, where the second virtual-channel identifier indicates the source and the destination for the ATM cell relative to the destination virtual-channel switch; and delivering the ATM cell to the destination.

Both the foregoing general description and the following detailed description are exemplary and explanatory only and do not restrict the invention as claimed. The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 4 is a chart of possible starting virtual-channel identifiers and possible destination virtual-channel identifiers for use in the ATM switch of FIG. 2 consistent with the present invention;

FIG. 6 is a chart of possible source virtual-channel identifiers for use in the ATM switch of FIG. 2 consistent with the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 2:
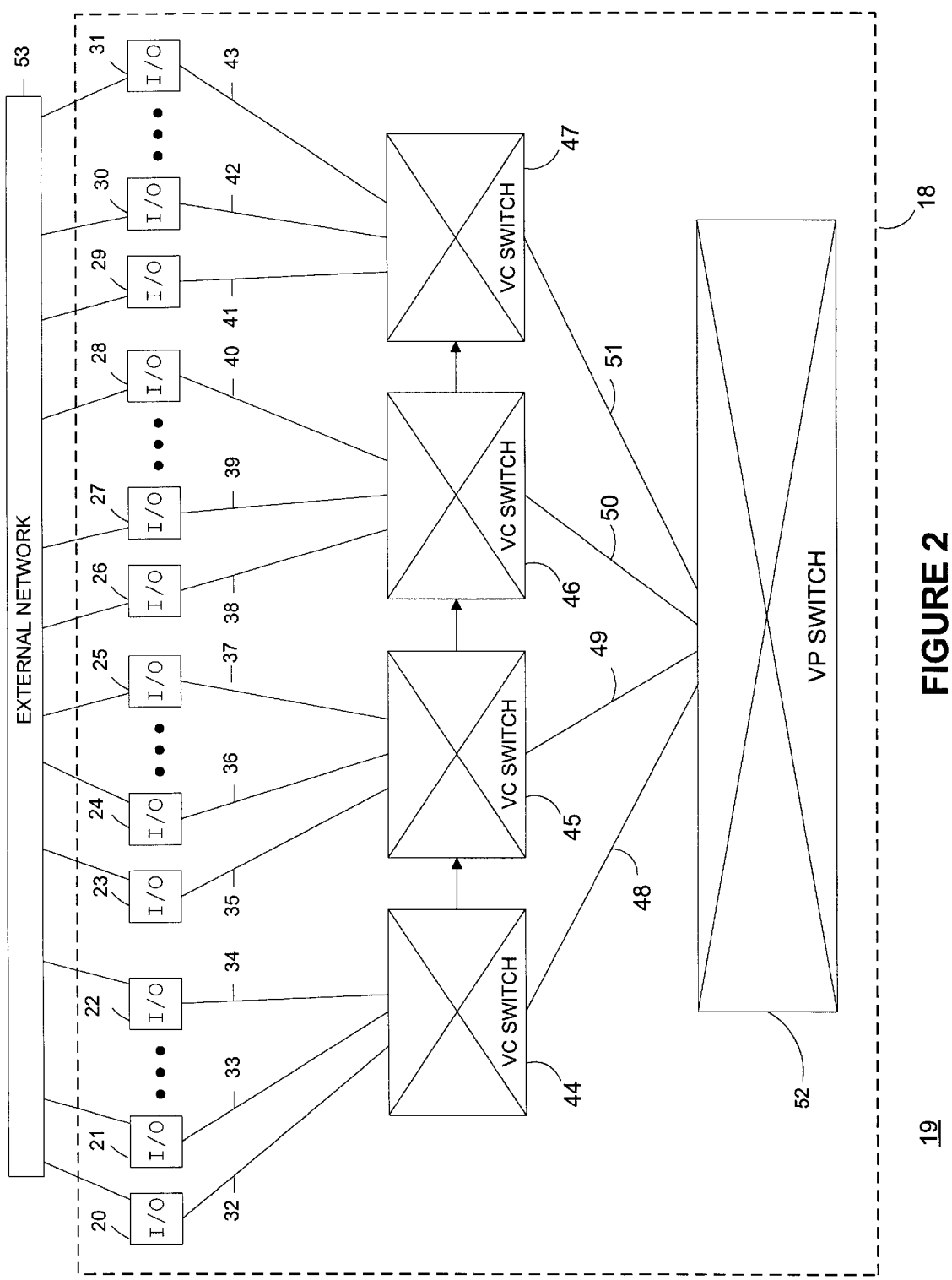
FIG. 2 is a block diagram of an ATM switch consistent with the present invention.

An ATM switch, such as 18 shown in FIG. 2, consistent with the present invention configures each VC switch 44–47 with a generic addressing structure. After configuration, each VC switch 44–47 views itself as the primary or zero-position VC switch within ATM switch 18 and addresses all other VC switches on a relative basis. In this manner, each VC switch can execute the same connection-setup algorithm. This uniformity helps improve maintenance and installation costs and make operation easier. Also, configuring each VC switch to route cells according to the same relative sequencing technique makes the number of VC switches used in the ATM switch and their interchangeability highly flexible. Accordingly, methods consistent with the present invention include configuring an ATM switch with VCI and VPI assignments based on the number of interface units, i.e. sources and destinations, coupled to the switch and operating the configured ATM switch to route ATM cells from source interface units to destination interface units. The method of configuring the ATM switch consistent with the present invention will become apparent from the description below of a preferred method of switching ATM cells within an ATM switch that has been configured with the generic addressing structure.

FIG. 2 shows an ATM switch 18 with interface units 20–31, virtual-channel (VC) switches 44–47, and virtual-path (VP) switch 52. ATM switch 18 is situated within an ATM switched network 19 that may include numerous other elements, referenced by element 53, for transmitting and receiving electronic communications.

ATM switch 18 provides multiplexing signal switch capabilities to route ATM cells between any of interface units 20–31. To do so, ATM switch 18 establishes virtual connections between ATM switch 18 and respective interface units 20–31 in conjunction with actual connections 32–43. As is readily known in the art, actual connections 32–43 establish point-to-point connections between switch 18 and the end-point to the respective connection.

Interface units 20–31 act as input and output locations, i.e. sources and destinations, for ATM switch 18. Interface units 20–31 are connected to an external network, again shown representationally by element 53. Each interface unit may have several ports (not shown) that accept messages from elements within the external network for switching within ATM switch 18. Likewise, the ports may also provide output passages for messages provided by ATM switch 18 to the respective interface unit. Whether or not connected to an external network, interface units 20–31 may serve as end-points for receiving and transmitting ATM messages within the ATM switch 18. For instance, interface units 20–31 may receive communications from an external network in a non-ATM protocol, convert the received messages to ATM cell format, and submit the ATM cells to ATM switch 18. Conversely, interface units 20–31 may receive ATM cells from ATM switch 18, convert the ATM cells to a different communication format, and transmit the communication through the external network.

ATM switch 18 includes several VC switches 44–47 coupled to interface units 20–31. VC switches 44–47 receive ATM cells from interface units 20–31 and multiplex or route the ATM cells with the assistance of VP switch 52 to an appropriate destination interface unit 20–31. For example, interface unit 24 may transmit an ATM cell to VC switch 45 using connection 36. VP switch 52 receives ATM cells from VC switches 44–47 and multiplexes or routes the ATM cells to an appropriate other VC switch 44–47. In doing so, VP switch 52 amends the virtual-path identifier field of the ATM cell to indicate the source VC switch before passing the ATM cell to the destination VC switch.

Figure 1:
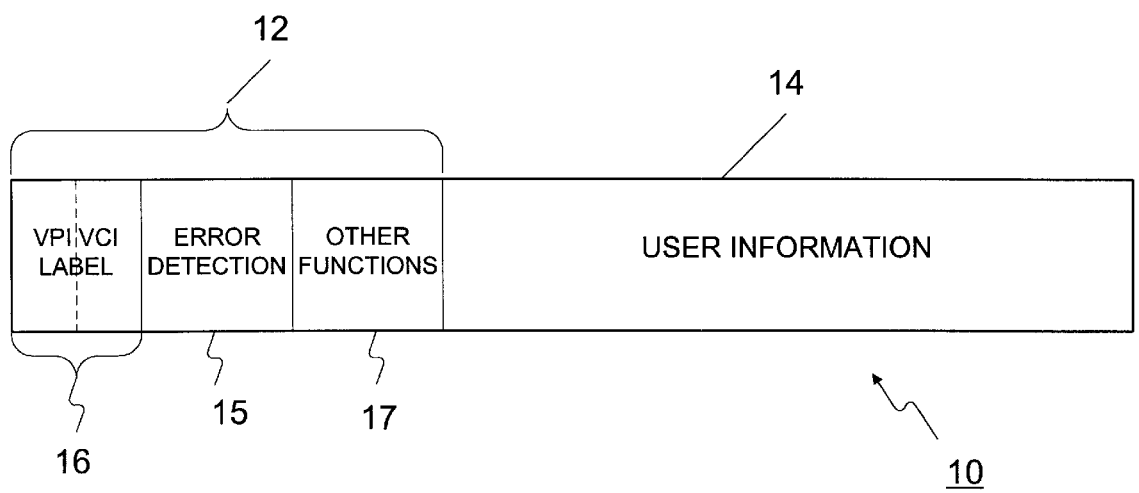
FIG. 1 is a diagram of a general format of an ATM cell.
Figure 3:
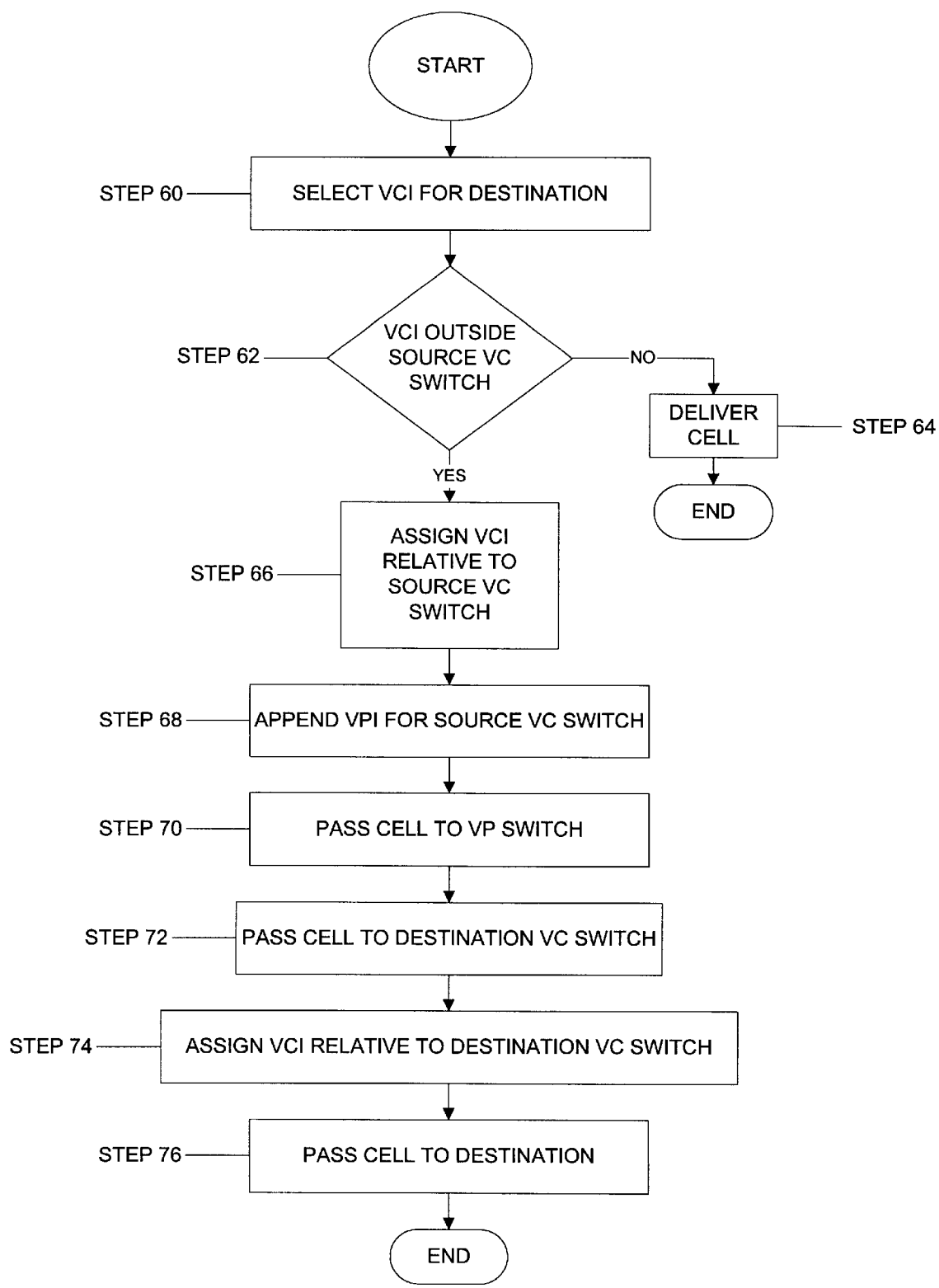
FIG. 3 is a flowchart of a preferred method for transmitting an ATM cell through the ATM switch of FIG. 2 consistent with the present invention.

FIG. 3 illustrates a preferred method for switching ATM cells in an ATM switch, such as switch 18 of FIG. 2. As shown in FIG. 3, a first one of the interface units 20–31, called for description purposes a "source interface unit," selects a preliminary or starting virtual-channel identifier (VCI) for an ATM cell to be switched within ATM switch 18 (step 60). Preferably, although not exclusively, interface units 20–31, VC switches 44–47, and VP switch 52 are circuit boards or electronic modules that contain at least a microprocessor or microcontroller, such as a Motorola MC-68000 series microprocessor or equivalent device, together with affiliated memory for storing and executing firmware or software instructions. The source interface unit selects the starting VCI from a table established during configuration of the switch and described in more detail below. The starting VCI set by the source interface unit will indicate a destination for the ATM cell relative to the "source" VC switch to which it is directly coupled. This first VCI for the ATM cell, which resides in VPI-VCI label 16 shown in FIG. 1, indicates at least the intended destination for the ATM cell, which is one of interface units 20–31. As an example, interface unit 24 may generate an ATM cell and associate a starting VCI code for the cell that indicates an intended destination of interface unit 27 for the cell.

FIG. 4 illustrates an exemplary set of starting VCIs for the ATM cell that are stored in each of the interface units and that are established during a process of configuring ATM switch 18. The first column 80 in FIG. 4 indicates the possible sources for an ATM cell received by one of VC switches 44–47. These sources correspond with a group of interface units coupled to a VC switch. The number of interface units coupled to a VC switch may vary depending on the implementation of the present invention. In one embodiment depicted in FIG. 2, each VC switch 44–47 has eighteen interface units coupled to it. For the example of VC switch 45 in FIG. 2, interface units 23–25 represent three of the eighteen interface units coupled to VC switch 45. Column 80 in FIG. 4 lists these eighteen sources, or interface units, as U1–U18.

Column 82 in FIG. 4 identifies the possible destinations directly coupled to the current switch, which in this example is VC switch 45. These possible destinations are for the eighteen interface units represented generally by references 23–25 in FIG. 2 and abbreviated as U1–U18 in FIG. 4.

The matrix within column 82 in FIG. 4 lists starting VCIs for ATM cells originating in the interface units 23–25 coupled to VC switch 45 that have one of the interface units in the group 23–25 as an intended destination. For instance, source U2, which corresponds with interface unit 24, associates possible starting VCIs shown in the second row of column 82 with the ATM cell. If the destination for the ATM cell is U4 within the same group of interface units coupled to VC switch 45, which are represented by interface units 23–25, then source U2 will associate a VCI equal to 4 in the VCI field of the ATM cell. As shown in FIG. 4, all sources that have U4 within the same group of interface units as an intended destination for the ATM cell will use 4 as the starting VCI.

While destinations within the same group of interface units as the source interface unit will have a starting VCI between 1 and 18 (column 82 of FIG. 4), destinations outside of the group directly coupled to the source VC switch will have a starting VCI greater than 18. The source interface unit and source VC switch address those destinations using an address with a switch identifier that indicates the position of the "destination" VC switch relative to the source VC switch. The source VC switch is viewed as the primary switch or zero-position switch, and all other VC switches have an offset position relative to the source switch. Thus, the VC switch next to the source VC switch will be viewed as relative switch no. 1 by the source interface unit and source VC switch. Likewise, the next VC switch after relative switch no. 1 will be viewed as relative switch no. 2 by the source interface unit and source VC switch. The highest numbered relative switch will be the one having a position previous to the source VC switch.

Figure 5:
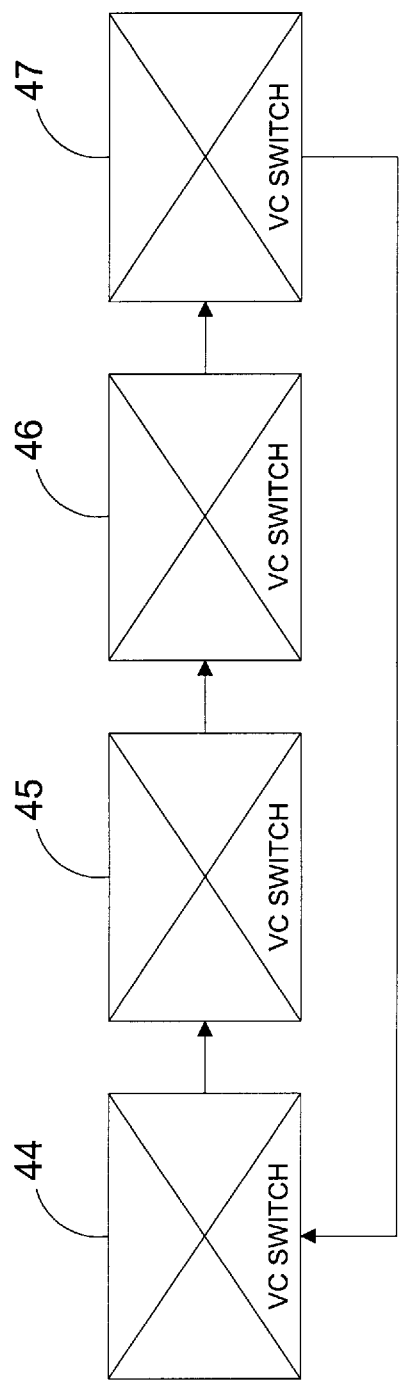
FIG. 5 is a block diagram of a preferred sequencing of virtual-channel switches in the ATM switch of FIG. 2 consistent with the present invention.

FIG. 5 illustrates the circular referencing used by the source interface unit and source VC switch in addressing other VC switches. The source VC switch, i.e. the VC switch that receives the ATM cell from an interface unit, refers to interface units that are coupled to other VC switches in ATM switch 18 relative to the position or location of the source VC switch. If VC switch 46 is the source VC switch, then switch 46 views VC switches 47, 44, and 45 as subsequent VC switches within ATM switch 18. Thus, VC switch 46 will view itself from an addressing perspective as switch no. 0, will view VC switch 47 as switch no. 1, will view VC switch 44 as switch no. 2, and will view VC switch 45 as switch no. 3. Likewise, if VC switch 47 is the source VC switch, then VC switch 47 will view itself as switch no. 0 and view VC switches 44–46 as switch nos. 1–3, respectively. In this illustration, the source VC switch addresses the other VC switches sequentially in the same direction, according to FIG. 5. The actual sequence used may instead follow the physical location of the VC switches within a card rack or the order of installation for the VC switches. The sequence chosen is not critical to the present invention in its broadest sense.

Referring to FIG. 4, columns 84–86 generally show a matrix of destinations within relative switch nos. 1–M. M indicates an undefined and variable number of VC switches incorporated within ATM switch 18. FIG. 2 illustrates ATM switch 18 with four VC switches, so M would be set to 3. As discussed in more detail below, the maximum number of switches M possible for ATM switch 18 depends upon the number of interface units per VC switch and the number of bits used for the VCI within the 16-bit VCI field 16. Consequently, and as shown in FIG. 4, a switch having 18 interface units directly coupled to each VC switch, and having (M+1) VC switches, will have atotal of 18*(M+1) possible starting VCIs.

With this explanation, the configuration and addressing scheme becomes more apparent. Column 82 indicates that destination interface units within the same group of interface units as the source interface unit will have a VCI between 1 and 18. Column 84 indicates that destination interface units that are directly coupled to the VC switch next to the source VC switch will have a VCI between 19 and 36. Column 86 indicates that destination interface units that are directly coupled to the VC switch previous to the source VC switch will have VCIs between (18*(M+1)−17) and (18*(M+1)).

For the ATM switch 18 of FIG. 2 with four VC switches, if VC switch 45 is the source VC switch, and the intended destination for the ATM cell is the interface unit 27 coupled to VC switch 46, the source interface unit 24 will assign a VCI of 20 to the VCI field. FIG. 4 indicates that a VCI of 20 corresponds to a destination that is the second interface unit coupled to the switch next in sequence to the source switch, i.e. relative switch no. 1. If the intended destination was the tenth interface unit coupled to the second relative switch, i.e. VC switch 47, then the VCI for the ATM cell would be 46.

Returning to FIG. 3, after a source interface unit selects a starting VCI for an ATM cell (step 60), the ATM cell will pass from the source interface unit to the VC switch coupled to the source interface unit. The source VC switch will then evaluate the VCI in the ATM cell to determine whether the intended destination for that cell is an interface unit that is not directly coupled to the source VC switch (step 62). For the example given in FIG. 4, the source VC switch will determine whether the VCI is greater than 18. If the intended destination is within the group of interface units directly coupled to the source VC switch, then the VC switch proceeds to transmit the ATM cell to that destination interface unit (step 64). For the example discussed above, if source U2 (interface unit 24) generates an ATM cell having U4 within the same group of interface units as a destination, the VCI will be 4, as shown in column 82 of FIG. 4. VC switch 45 coupled to both U2 and U4 will receive the ATM cell from U2, evaluate the VCI, determine that the destination is within the interface units directly coupled to it, and deliver the cell to U4.

However, if the source VC switch determines that the cell is destined for an interface unit coupled to another VC switch in ATM switch 18, the source VC switch will convert the starting VCI to a different VCI, for description purposes called an "intermediate VCI" (step 66). The intermediate VCI provides a code for addressing an interface unit coupled to a VC switch other than the source VC switch. FIG. 6 depicts the possible intermediate VCIs generated by an intermediate VC switch for ATM cells destined for interface units coupled to other VC switches. Unlike the starting VCIs, each VCI has a unique code. Column 90 lists the possible sources that generated the ATM cell, i.e. the eighteen interface units directly coupled to the source VC switch. Column 92 shows a matrix of the transformed VCIs for destinations within interface units coupled to relative switch no. 1. There are, for 18 interface units per switch, 18 times 18 or 324 possible VCIs. Column 94 shows a matrix of intermediate VCIs for possible destinations within interface units coupled to relative switch no. 2, and column 96 shows the same for relative switch no. M. A switch having 18 interface units directly coupled to each VC switch and having (M+1) VC switches will have $18^2*M$ or $324*M$ possible unique intermediate VCIs. Thus, an ATM cell from interface unit U1 coupled to the source VC switch and destined for interface unit U4 coupled to relative switch no. 1 has its VCI changed from 22 to 4. Similarly, an ATM cell from interface unit U18 and destined for interface unit U18 coupled to relative switch no. M has its VCI changed from $(18*(M+1))$ to $(M*324)$. As a result of the transformation of the ATM cell VCI, each ATM cell leaving the source VC switch for another VC switch will have a unique VCI indicating an intended destination for the cell relative to the source interface unit and source VC switch. Consequently, the unique intermediate VCI, unlike the starting VCI, will reflect information about both the destination and the source of the cell.

Referring again to FIG. 3, after the source VC switch 44–47 assigns an intermediate VCI to the ATM cell, that source VC switch appends or amends the VPI field 17 in the ATM cell to indicate the relative VC switch number for the cell (step 68). For example, if VC switch 45 has an ATM cell destined for VC switch 47, VC switch 45 will make the VPI of the cell equal to 2 to indicate that the cell should go to relative switch no. 2. The source VC switch then transmits the cell to VP switch 52 (step 70). VP switch 52 then properly routes the ATM cell to the destination VC switch (step 72).

VP switch 52 preferably has separate ports for each of its connections with VC switches 44–47 and routes the ATM cell to the appropriate destination VC switch based on the VPI field in the received ATM cell. VP switch 52 can, in the preferred embodiment, simply add the VPI value in the ATM cell to the port number on which the ATM cell arrived to determine the port number on which to route the cell.

The destination VC switch converts the VCI to a value relative to its position rather than the position of the source VC switch (step 74), for discussion purposes called a "final VCI." To do so, the destination VC switch calculates the starting VCI that it would assign to the ATM cell to return it to its sender. The destination VC switch determines the appropriate VCI that is relative to its position by referring to the table in FIG. 4. For example, VCI=307 received by VC switch 46, means U18 within VC switch 45 is the source, and the cell is destined for interface unit U1 within the group of interface units directly coupled to VC switch 46. VC switch 46 refers to the tables in FIG. 4 to determine that the starting VCI that would return the cell to U18 within VC switch 45 is 72. Consequently, VC switch 46 converts the intermediate VCI of the received ATM cell to a final VCI=72 and delivers the cell to the destination interface unit U1 (step 76).

More specifically, the destination VC switch first determines both the proper interface unit destination for the ATM cell and the switch position of the source VC switch based on the intermediate VCI and the VPI values. For instance, when VC switch 46 receives a cell from VP switch 52 having VCI=307, the destination VC switch can determine from this intermediate VCI and the tables in FIG. 4 that the cell originated at interface unit U 18 within VC switch 45 and is destined for interface unit U1 within the group of interface units directly coupled to VC switch 46. After receiving the ATM cell from VP switch 52, the destination VC switch changes the intermediate VCI to a final VCI appropriately.

Alternatively, for ATM cells that have a destination interface unit that is within the set of interface units coupled to the source virtual-channel switch, the source virtual-channel switch will convert the starting VCI to a final VCI without using an intermediate VCI. The ATM cell to received by the source virtual-channel switch will have its starting VCI resident within the VPI-VCI label, which will indicate the desired destination interface unit relative to the position of the source virtual-channel switch. When, for the embodiment of FIG. 2, the starting VCI is less than 19, the source virtual-channel switch will convert the starting VCI to a final VCI that indicates the location of the source interface unit relative to the location of the destination interface unit. The virtual-channel switch, which in this situation serves as both the source and the destination virtual-channel switch, will then deliver the ATM cell to the destination interface unit.

ATM switch 18 may configure each of its VC switches 44–47 at an appropriate time. To do so, ATM switch 18 may develop mapping tables, such as those shown in FIGS. 4 and 6, for each interface unit and VC switch to match the sources directly coupled to that VC switch with all of the destinations coupled to the other VC switches in ATM switch 18. As a result, memory within each interface unit or VC switch will contain substantially identical look-up tables showing possible starting VCIs that map the VC switch's sources with all possible destinations and possible intermediate VCIs that map the VC switch's sources with destinations in the relative switches using unique codes. The table of intermediate VCIs may be determined by first assigning possible starting VCIs in a table and then mapping the starting VCIs for relative switch destinations into unique intermediate VCIs for a second table. This process of configuring the ATM switch may take place after power-up, after addition of a VC switch, and after deletion of a VC switch, although the circumstances for configuring the switch are not critical to the present invention in its broadest sense.

Systems and methods consistent with this invention permit a consistent and flexible technique for adding or deleting VC switches within an ATM switch. Because each VC switch views itself as the primary or zero-position switch and addresses all other VC switches on a relative basis, each VC switch can execute the same connection-setup algorithm. This uniformity helps improve maintenance and installation costs and make operation easier. Also, having each VC switch route cells according to the same relative sequencing technique makes the number of VC switches used in the ATM switch and their interchangeability highly flexible. The ATM switch may have a single stand-alone VC switch, two VC switches directly connected to each other without a VP switch, or several VC switches connected together using a VP switch. The maximum number of VC switches depends on the number of bits used in the VCI and the number of sources and destinations connected to the VC switches. Specifically, the maximum number of VC switches will equal $(2^n)/$(number of sources)(number of destinations), where n equals the number of bits used in the VCI. For the examples in FIGS. 4 and 6, when the ATM switch has 18 sources and 18 destinations for each VC switch and uses 12 bits of the VCI field, the maximum number of VC switches possible will be $(2^{12})/(18)(18)=12.64$, or 12, VC switches. The number of sources and destinations in interface units is also highly flexible for the VC switches.

In addition, when each of the VC switches within ATM switch 18 incorporates the relative sequencing scheme of addressing other VC switches, the number of potential interface units that are addressable increases substantially. Using all 16 bits of a cell's VCI allowed ATM systems prior to the present invention to address $2^{16}$ or 65,536 destinations. Systems consistent with the present invention, either allowed conventional switches to address the same number of bits in the VCI field to address many more destinations or allow fewer bits in the VCI field to address the same number of systems. For example, in conventional systems that might use 12 bits in the VCI field for addressing, $2^{12}$ or 4,096 distinct destinations could be accessed for an ATM cell. Systems consistent with the present invention allow an ATM switch to make connections to the number of sources times the number of destinations times the square of the number ATM switches used in the ATM switch. For the example shown in FIGS. 4 and 6, if the VCI uses 12 bits and the system has 12 VC switches, then the ATM switch can make $(18)(18)(144)=46,656$ connections. Moreover, the remaining bits of the VCI can then be used for other purposes within ATM switch 18.

An ATM switch and method consistent with the present invention works in telecommunications networks such as those employing Common Channel Signaling (CCS), which provide a dedicated supervisory network for segregating signaling information from voice and data information in a telecommunications network. CCS was developed to meet the increased demands placed on the public telecommunications network by the growing market for voice, data, and information services. Previous signaling systems sent call setup and routing information over the same trunk circuit used for voice transmission. With CCS, a single out-of-band channel conveys signaling information relating to call setup, routing, and network management, among other things. Signaling System No. 7 (SS7), an international protocol standard for CCS communications, creates a universal format for communicating signaling information in a CCS network (CCS7).

CCS7 networks also provide numerous advanced features for telecommunications users. By enabling communication between processors in central offices, CCS7 permits on-line or external databases to be queried. This capability opens access to such features as network-wide automated calling card service, Advanced Intelligent Network-based residential and business services, Custom Local Area Signaling Services, and Virtual Private Networking. Other advantages provided by CCS7 include Calling Number/Name Delivery and Automatic Callback to work across an entire network rather than just between subscribers served by the same central office.

Figure 7:
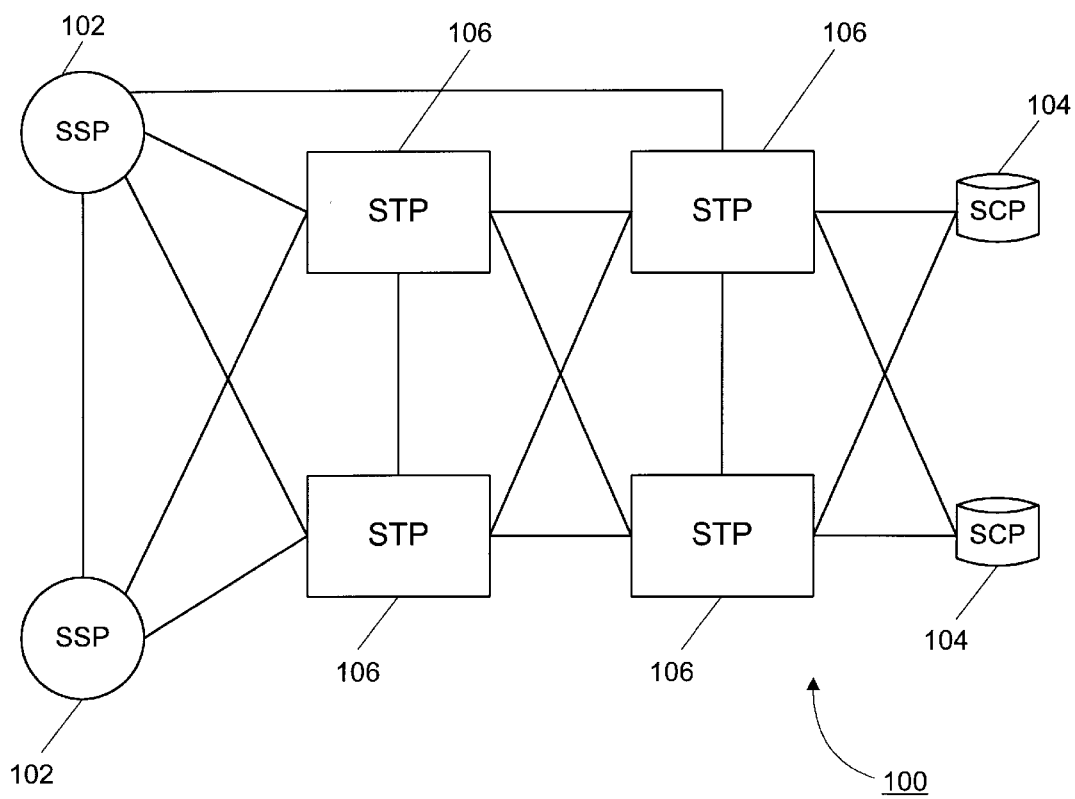
FIG. 7 is a block diagram of a Common Channel Signaling network for using the ATM switch of FIG. 2 consistent with the present invention.

FIG. 7 illustrates a typical CCS7 network configuration with three key signaling points: a Service Switching Point (SSP) 102; a Service Control Point (SCP) 104; and a Signaling Transfer Point (STP) 106. SSPs 102 are located at a central office to provide CCS7 trunk signaling and/or the capability to query a database to determine call routing. SCPs 104 house databases with call routing information that SSPs and other network elements use to provide advanced services in a telecommunications network. STPs 106 route CCS7 messages between the signaling points and control access to the CCS7 network.

STPs 106 provide a key function in processing the signaling used in telecommunications. Unlike other nodes in a CCS7 network 100, STPs 106 do not generally act as a source or ultimate destination of CCS7 application messages. Instead, they function as both a static and dynamic routing database that controls access to, and directs call signaling between, a variety of CCS7 nodes and networks. The STP monitors, maintains, and reports different levels of information concerning the availability and unavailability of CCS7 nodes, routes, and services.

One of the STPs 106 may contain an ATM switch according to the present invention. That STP may also include several interface units 20–31 for coordinating communications between the STP 106 and other nodes in CCS7 network 100. Communications along links in CCS7 100 may occur in an ATM format, or the interface units 20–31 within STP 106 may adapt the received communications to an ATM format for multiplexing and routing within the ATM switch 18 of one of the STPs 106. Accordingly, that STP will include several VC switches, such as 44–47, and a VP switch 52, if necessary, for coordinating the transfer of ATM cells between the VC switches, as described in detail above.

Interface units 20–31 may also contain communication links with elements of other elements besides ATM switch 18 shown in FIG. 2. For instance, ATM switch 18 may establish a virtual connection with another ATM switch (not shown), which may have separate virtual connections with nodes or other ATM switches or elements. The connection of ATM switch 18 with other networks may become expansive, well beyond that depicted in FIG. 2.

Other embodiments of the invention will be apparent to those skilled in the art from consideration of the specification and practice of the invention disclosed herein. The specification and examples are as exemplary only, with a true scope and spirit of the invention being indicated by the following claims.

What is claimed is:

1. An ATM switch for switching ATM cells between ports linking the ATM switch with a network, the ATM switch comprising:

a plurality of interface units connected to the ports and being arranged in groups;

a source virtual-channel switch, coupled to a first one of the groups of interface units that includes a source interface unit, for receiving from the first group an ATM cell having a starting virtual-channel identifier and for translating the starting virtual-channel identifier to an intermediate virtual-channel identifier, the starting virtual-channel identifier indicating a position of a destination interface unit for the ATM cell relative to the source virtual-channel switch, the destination interface unit being part of a second group of interface units, and the intermediate virtual-channel identifier indicating the position of the destination interface unit for the ATM cell relative to the source interface unit; and a destination virtual-channel switch, coupled to the source virtual-channel switch and to the second group of interface units, for converting the intermediate virtual-channel identifier to a final virtual-channel identifier and for routing the ATM cell to the destination interface unit, the final virtual-channel identifier indicating a position of the source interface unit relative to the destination virtual-channel switch.

2. The ATM switch of claim 1, wherein the source virtual-channel switch includes means for inserting a virtual-path identifier to the ATM cell.

3. The ATM switch of claim 2, further comprising:
a virtual-path switch, coupled to the source virtual-channel switch and the destination virtual-channel switch, to transfer the ATM cell from the source virtual-channel switch to the destination virtual-channel switch.

4. The ATM switch of claim 1, wherein the ATM switch includes a plurality of virtual-channel switches each coupled to a different one of the groups of the plurality of interface units, each of the plurality of virtual-channel switches becoming the source virtual-channel switch upon receiving an ATM cell from the one of the groups coupled to that virtual-channel switch.

5. The ATM switch of claim 1, wherein the source virtual-channel switch includes source memory storing intermediate virtual-channel identifiers each corresponding both to one of the first group of interface units and to one of the plurality of interface units other than the first group of interface units.

6. The ATM switch of claim 5, wherein the maximum number of unique intermediate virtual-channel identifiers equals $2^n$, where n equals the number of bits of the intermediate virtual-channel identifiers.

7. The ATM switch of claim 5, wherein the ATM switch includes a plurality of virtual-channel switches each coupled to one of the groups of the plurality of interface units, each of the plurality of virtual-channel switches having the intermediate virtual-channel identifiers.

8. The ATM switch of claim 1, wherein the destination virtual-channel switch includes destination memory storing final virtual-channel identifiers each corresponding both to one of the second group of interface units and to one of the plurality of interface units.

9. The ATM switch of claim 8, wherein the maximum number of unique intermediate virtual-channel identifiers equals the plurality of interface units.

10. The ATM switch of claim 8, wherein the ATM switch includes a plurality of virtual-channel switches each coupled to one of the groups of the plurality of interface units, each of the plurality of virtual-channel switches having the final virtual-channel identifiers.

11. A signaling transfer point for use in a common channel signaling network, comprising:
sets of interface units coupled to the common channel signaling network through ports;
a source virtual-channel switch, coupled to a first set of interface units that includes a source interface unit, for receiving from the first set an ATM cell having a starting virtual-channel identifier and for translating the starting virtual-channel identifier to an intermediate virtual-channel identifier, the starting virtual-channel identifier indicating a position of a destination interface unit for the ATM cell relative to the source virtual-channel switch, the destination interface unit being part of a second group of interface units, and the intermediate virtual-channel identifier indicating the position of the destination interface unit for the ATM cell relative to the source interface unit; and a destination virtual-channel switch, coupled to the source virtual-channel switch and to the second set of interface units, for converting the intermediate virtual-channel identifier to a final virtual-channel identifier and for routing the ATM cell to the destination interface unit, the final virtual-channel identifier indicating a position of the source interface unit relative to the destination virtual-channel switch.

12. A method for configuring an ATM switch having a set of virtual-channel switches coupled together, each of the set of virtual-channel switches being coupled to a set of interface units linking the ATM switch and a network, the method comprising the steps of:

(a) assigning user codes for the set of interface units coupled to one of the set of virtual-channel switches;

(b) assigning first destination codes for the set of interface units coupled to the one virtual-channel switch and second destination codes for the set of interface units coupled to others of the virtual-channel switches;

(c) mapping the user codes to respective first destination codes using starting virtual-channel identifiers indicating positions of the respective interface units coupled to the one virtual-channel switch relative to the one virtual-channel switch; and (d) mapping the user codes to the second destination codes using unique intermediate virtual-channel identifiers indicating positions of the respective interface units coupled to the others of the virtual-channel switches relative to respective interface units coupled to the one virtual-channel switch.

13. The method of claim 12, further comprising the step of performing steps (a)–(d) for another of the set of virtual-channel switches.

14. The method of claim 13, wherein the step of using starting virtual-channel identifiers includes the substep of using respective starting virtual-channel identifiers for the one virtual-channel switch and respective starting virtual-channel identifiers for others of the set of virtual-channel switches that are identical.

15. The method of claim 13, wherein the respective starting virtual-channel identifiers for the one virtual-channel switch and respective starting virtual-channel identifiers for others of the set of virtual-channel switches are identical.

16. The method of claim 12, wherein the step of using starting virtual-channel identifiers includes the substep of mapping the user codes to the second destination codes using starting virtual-channel identifiers, each user code having the same starting virtual-channel identifier for respective second destination codes.

17. The method of claim 16, wherein the step of using unique intermediate virtual-channel identifiers includes the substep of converting the starting virtual-channel identifiers for the second destination codes into intermediate virtual-channel identifiers.

18. A method for switching an ATM cell from a source to a destination in an ATM switch, the ATM switch including a set of virtual-channel switches coupled together, each of the set of virtual-channel switches being coupled to a set of interface units, the interface units linking the ATM switch and a network, the source of the ATM cell being an interface unit coupled to a source virtual-channel switch, the destination being an interface unit coupled to a destination virtual-channel switch, the method comprising the steps of:

receiving the ATM cell at the source virtual-channel switch, the ATM cell having a source virtual-channel identifier indicating a position of a destination for the ATM cell relative to the source virtual-channel switch;

associating an intermediate virtual-channel identifier with the ATM cell, the intermediate virtual-channel identifier indicating a position of the destination for the ATM cell relative to the source interface unit, the destination being one of a group of destinations coupled to another virtual-channel switch;

sending the ATM cell from the source virtual-channel switch;

receiving the ATM cell at the destination virtual-channel switch; and converting the intermediate virtual-channel identifier to a final virtual-channel identifier at the destination virtual-channel switch, the final virtual-channel identifier indicating a position of the source interface unit relative to the destination virtual-channel switch; and delivering the ATM cell to the destination.

19. The method of claim 18, wherein the associating step inserts a virtual-path identifier to the ATM cell, the virtual-path identifier identifying a position of the destination virtual-channel switch relative to the source virtual-channel switch.

20. The method of claim 19, further comprising, after the sending step, the steps of:

receiving the ATM cell at a virtual-path switch, the virtual-path switch being coupled to the set of virtual-channel switches via distinct ports; and routing the ATM cell to the destination virtual-channel switch.

21. The method of claim 18, wherein the ATM cell received at the source virtual-channel switch includes a starting virtual-channel identifier indicating the position of the destination for the ATM cell relative to the source virtual-channel switch and the associating step includes the substep of converting the starting virtual-channel identifier to the intermediate virtual-channel identifier.

22. The method of claim 18, wherein the associating step associates the intermediate virtual-channel identifier by searching a table of intermediate virtual-channel identifiers.

23. The method of claim 22, wherein the table of intermediate virtual-channel identifiers includes a maximum number of unique intermediate virtual-channel identifiers equal to $2^n$, where n equals the number of bits of the intermediate virtual-channel identifiers.

24. The method of claim 22, wherein the set of virtual-channel switches each has the table of intermediate virtual-channel identifiers.

25. The method of claim 18, wherein the converting step converts the intermediate virtual-channel identifier by searching a table of final virtual-channel identifiers.

26. The method of claim 25, wherein the table of final virtual-channel identifiers includes a maximum number of unique final virtual-channel identifiers equal to the set of interface units.

27. The method of claim 25, wherein the set of virtual-channel switches each has the table of intermediate virtual-channel identifiers.

\* \* \* \* \*